(12) United States Patent
Fuentes

(10) Patent No.: US 7,810,973 B1
(45) Date of Patent: Oct. 12, 2010

(54) VEHICLE LIGHT SYSTEM

(76) Inventor: James A. Fuentes, 15390 E. Lujon St., Hacienda Heights, CA (US) 91745

( * ) Notice: Subject to any disclaimer, the term of this patent is extended or adjusted under 35 U.S.C. 154(b) by 257 days.

(21) Appl. No.: 12/179,333

(22) Filed: Jul. 24, 2008

(51) Int. Cl.
*F21S 8/10* (2006.01)

(52) U.S. Cl. .................. 362/545; 362/493; 362/473

(58) Field of Classification Search ............ 362/545, 362/493, 473, 490, 479, 555, 485, 540, 544
See application file for complete search history.

(56) References Cited

U.S. PATENT DOCUMENTS

| | | | | |
|---|---|---|---|---|
| 4,964,022 | A * | 10/1990 | Lane | 362/481 |
| 5,567,036 | A * | 10/1996 | Theobald et al. | 362/485 |
| 5,615,940 | A * | 4/1997 | Barry | 362/473 |
| 6,431,728 | B1 * | 8/2002 | Fredericks et al. | 362/244 |
| D477,400 | S | 7/2003 | Myers et al. | |
| 6,688,752 | B2 | 2/2004 | Moore | |
| 6,836,081 | B2 | 12/2004 | Swanson et al. | |
| D510,149 | S | 9/2005 | Huang | |
| 7,118,261 | B2 * | 10/2006 | Fredericks et al. | 362/545 |
| 7,237,932 | B2 * | 7/2007 | Ter-Hovhannissian | 362/485 |
| 7,621,662 | B1 * | 11/2009 | Colbert | 362/493 |
| 2004/0223326 | A1 | 11/2004 | Wainwright | |
| 2005/0196716 | A1 | 9/2005 | Haab et al. | |
| 2006/0098428 | A1 | 5/2006 | Rosserot | |

* cited by examiner

*Primary Examiner*—Gunyoung T Lee

(57) ABSTRACT

A vehicle light system includes a light assembly that includes a base having a top side, a bottom side, a first lateral edge, a second lateral edge, a front edge and a rear edge. The base has a centrally positioned raised area along a line from the front edge to the rear edge. Each of the top and bottom sides is angled upwardly from the first and second lateral edges toward the line. The base is flame-shaped and each of the first and second lateral sides including a plurality of appendages. A plurality of light emitters is mounted on the top side of the base. A power source is electrically coupled to the light emitters. The power source is a power source of a vehicle. A plurality of fasteners is extended into the base to secure the base to the vehicle.

11 Claims, 6 Drawing Sheets

VEHICLE LIGHT SYSTEM

BACKGROUND OF THE INVENTION

Field of the Invention

The present invention relates to vehicle light devices and more particularly pertains to a new vehicle light device for providing auxiliary lighting for a vehicle.

SUMMARY OF THE INVENTION

The present invention meets the needs presented above by generally comprising a light assembly that includes a base having a top side, a bottom side, a first lateral edge, a second lateral edge, a front edge and a rear edge. The base has a centrally positioned raised area along a line from the front edge to the rear edge. Each of the top and bottom sides is angled upwardly from the first and second lateral edges toward the line. The base is flame-shaped and each of the first and second lateral sides including a plurality of appendages. A plurality of light emitters is mounted on the top side of the base. The light emitters are positioned along the line and along each of the appendages. A power source is electrically coupled to the light emitters. The power source is a power source of a vehicle. A plurality of fasteners is extended into the base to secure the base to the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
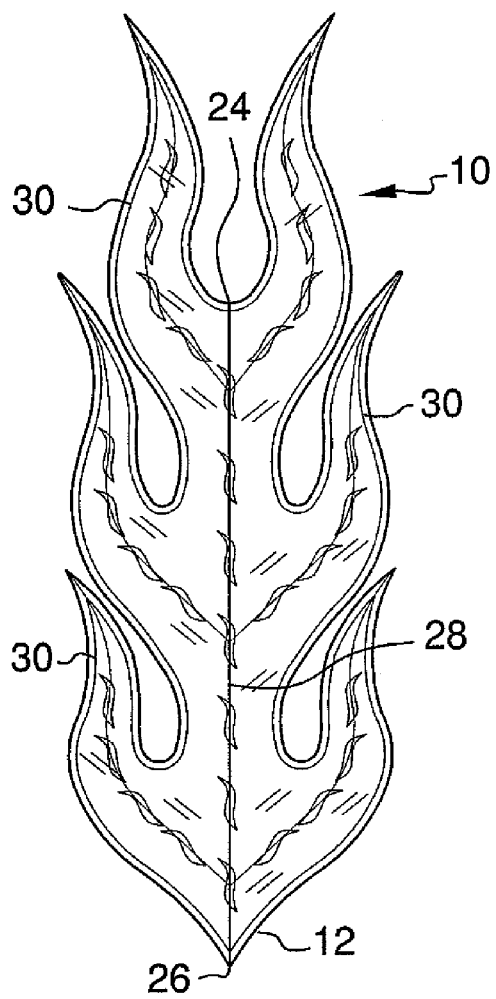
FIG. 1 is a top view of a vehicle light system according to the present invention.
Figure 2:
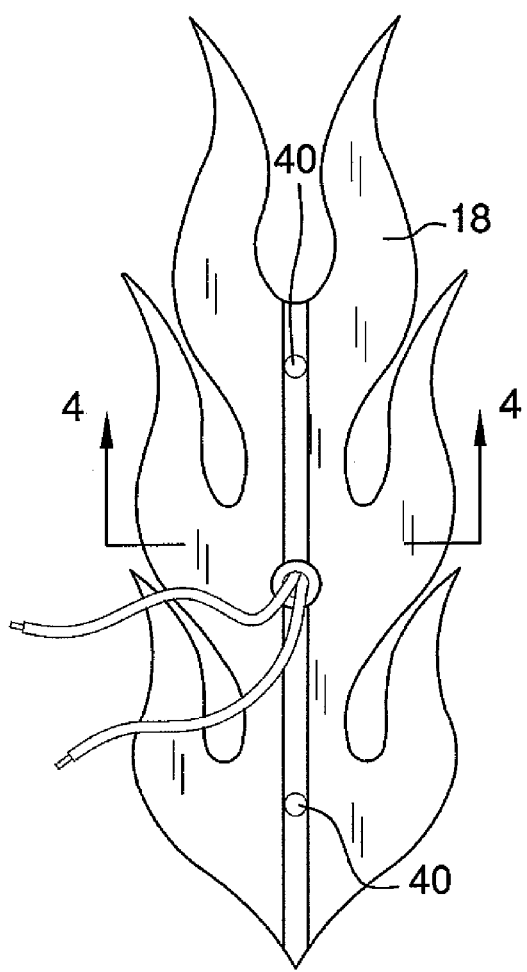
FIG. 2 is a bottom view of the present invention.

With reference now to the drawings, and in particular to FIGS. 1 through 11 thereof, a new vehicle light device embodying the principles and concepts of the present invention and generally designated by the reference numeral 10 will be described.

As best illustrated in FIGS. 1 through 11, the vehicle light system 10 generally comprises a light assembly 12 that includes a base 14 having a top side 16, a bottom side 18, a first lateral edge 20, a second lateral edge 22, a front edge 24 and a rear edge 26. The base 14 has a centrally positioned raised area along a line 28 from the front edge 24 to the rear edge 26. Each of the top 16 and bottom 18 sides is angled upwardly from the first 20 and second 22 lateral edges toward the line 28. The base 14 is flame-shaped and each of the first 18 and second 20 lateral sides includes a plurality of appendages 30.

A plurality of light emitters 32 is mounted on the top side 16 of the base 14. The light emitters 32 are positioned along the line 28 and along each of the appendages 30. Each of the light emitters 32 comprises a light emitting diode. The light emitters 32 are S-shaped to provide a better flame-like appearance.

A covering 34 is attached to the base 14 and covers the plurality of light emitters 32. The covering 34 comprises a translucent material. The covering 34 may be colored, such as orange or red.

A power source 36 is electrically coupled to the light emitters 32. The power source 36 is a power source of a vehicle 8. Alternatively, a separate battery may be electrically coupled to the light emitters 32.

Figure 1A:
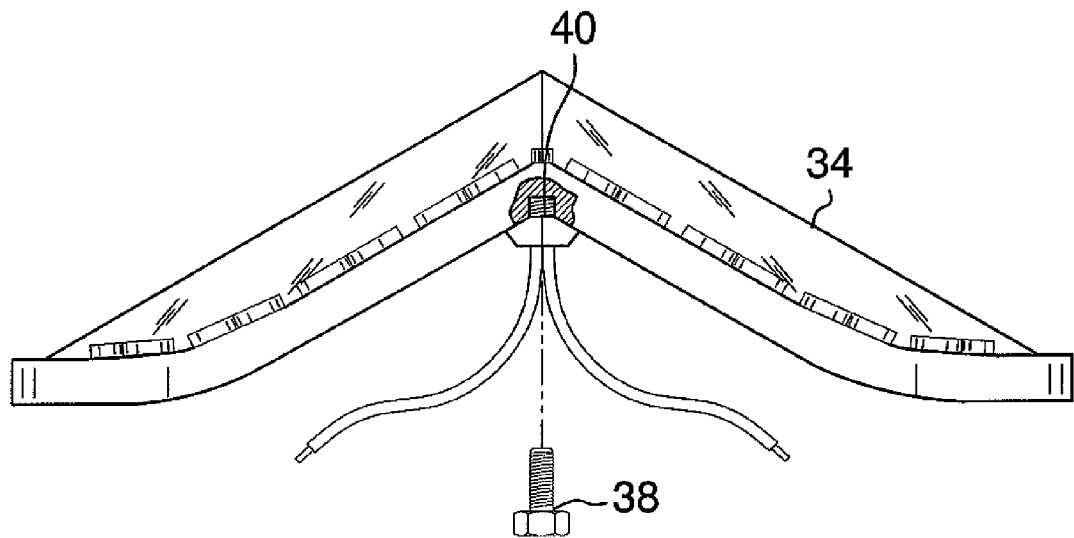
FIG. 1A is an end view of FIG. 1 of the present invention.
Figure 11:
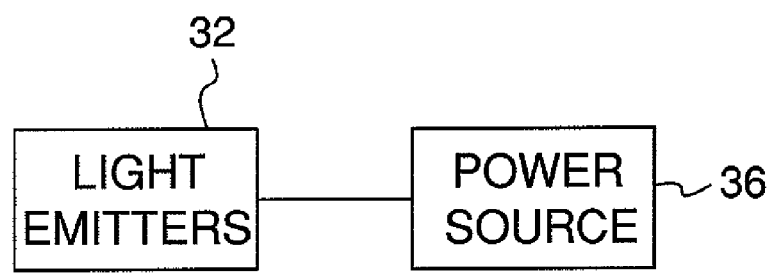
FIG. 11 is a schematic view of the present invention.
Figure 3:
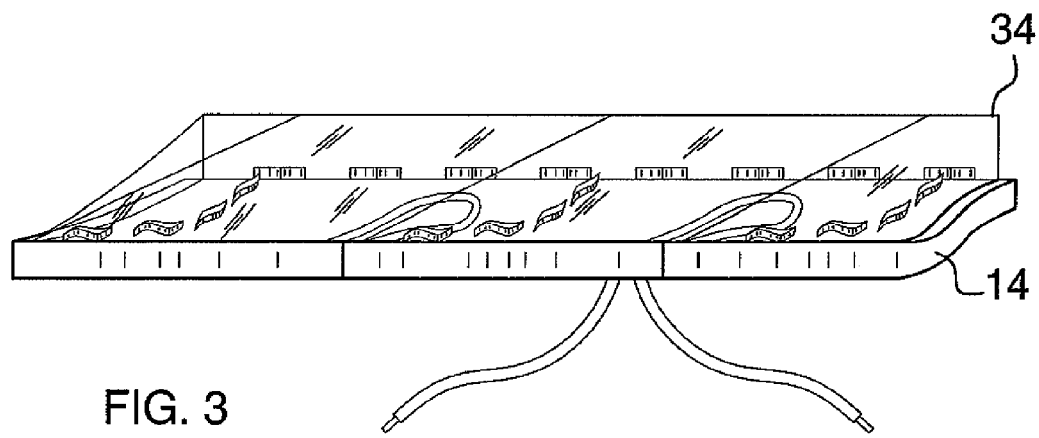
FIG. 3 is a side view of the present invention.
Figure 4:
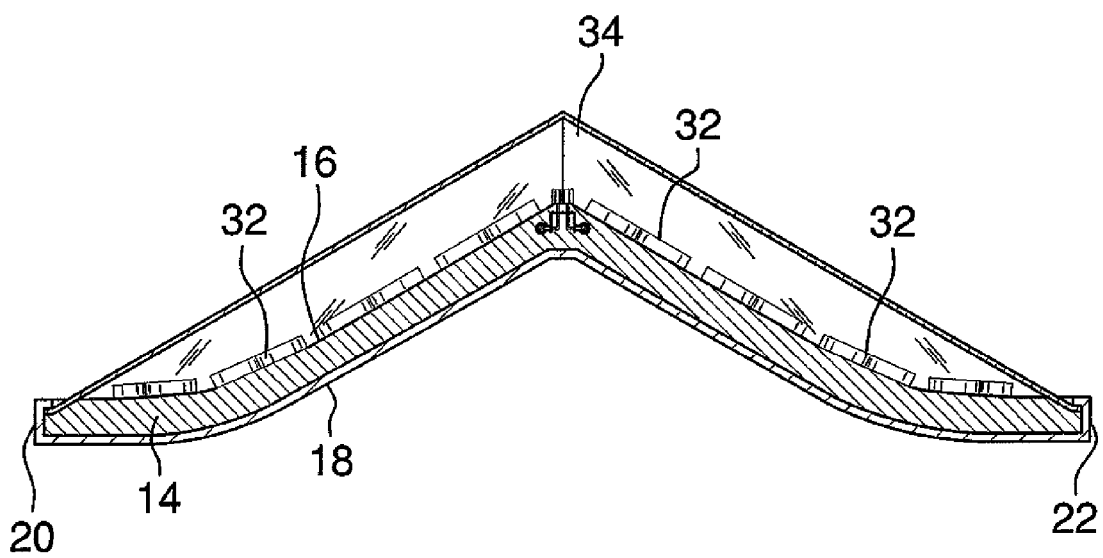
FIG. 4 is a cross-sectional view taken along line 4-4 of FIG. 2 of the present invention.
Figure 7:
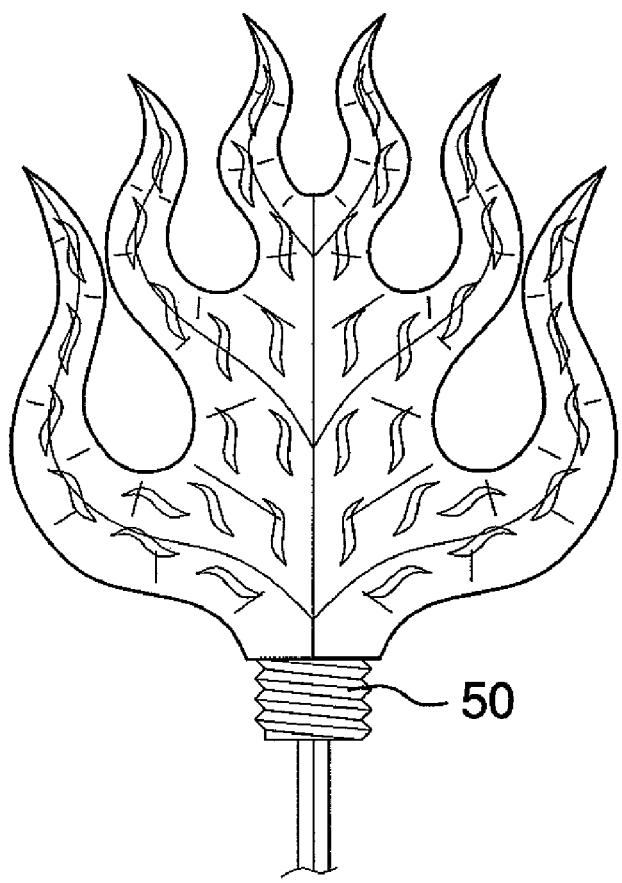
FIG. 7 is a front view of a second embodiment the present invention.
Figure 8:
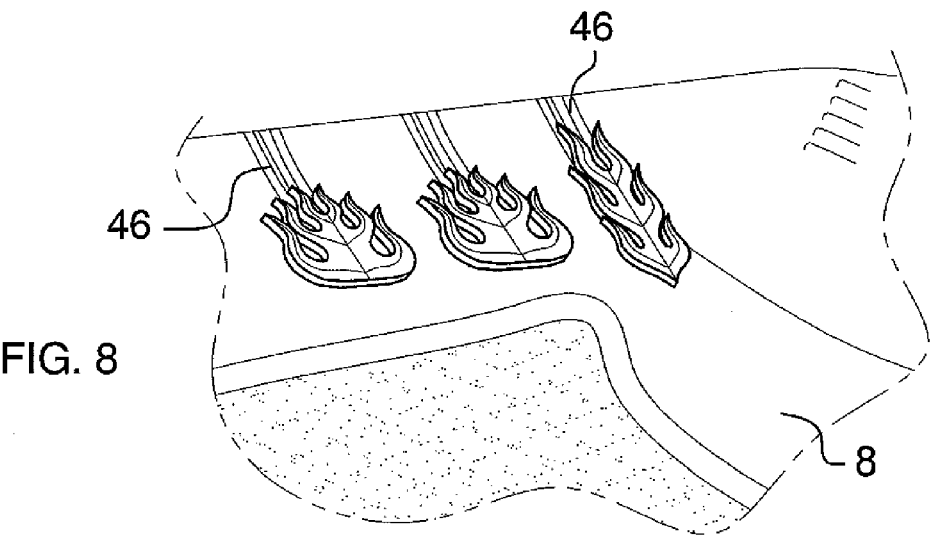
FIG. 8 is a perspective in-use view of a third embodiment of the present invention.

A plurality of fasteners 38 is extendable through the vehicle 8 and into mounting wells 40 extending into the bottom side 18 of the base 14 to releasably secure the base 14 to the vehicle 8. The fasteners 38 may be extended through a fender 42 if the vehicle 8 is a car or a motorcycle, or through the roof 44 of a car or truck. Further, the fasteners 38 may be used to attach the bases to vehicle pedals 46, as shown in FIG. 8, though this embodiment will typically be less raised than that shown in FIG. 1A.

Figure 9A:
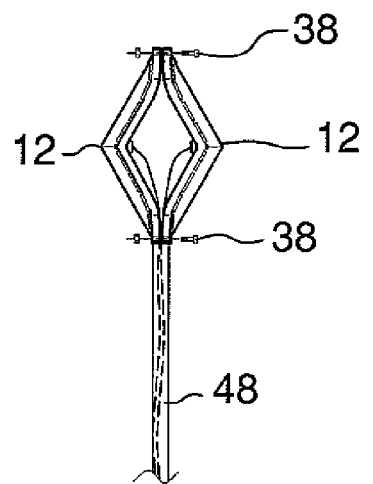
FIG. 9A is an end view of the fourth embodiment of the present invention.
Figure 9:
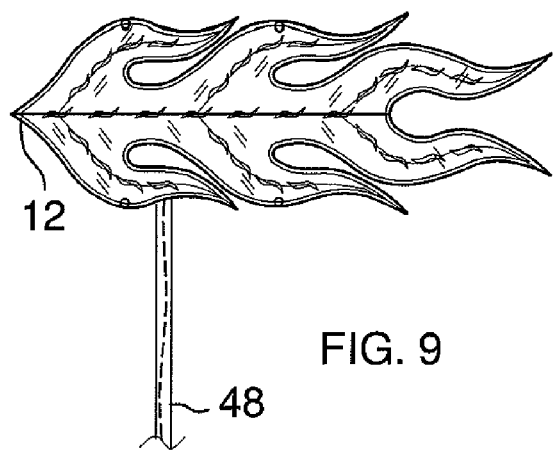
FIG. 9 is a side view of a fourth embodiment of the present invention.

Alternatively, the fasteners 38 may be extended through a pair of light assemblies 12 as shown in FIGS. 9 and 9A. With this embodiment, the light assemblies 12 may be positioned on a post 48, which is attached to a vehicle 8, so that the post 48 extends downwardly from the light assemblies 12.

Figure 5:
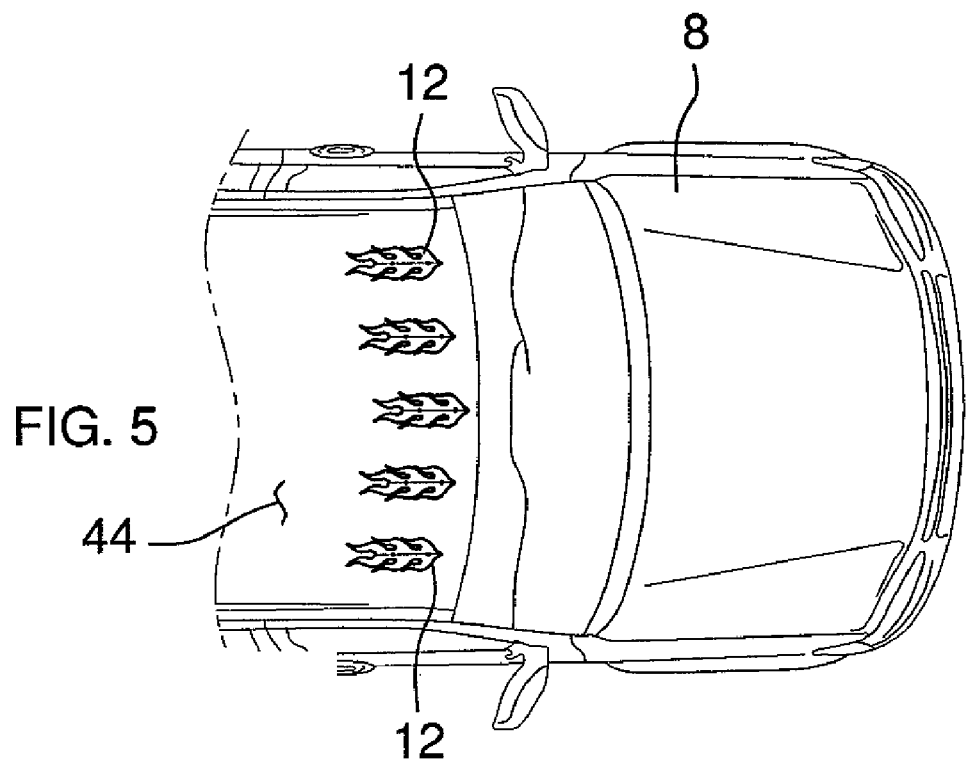
FIG. 5 is a top in-use view of the present invention positioned on a car roof.
Figure 6:
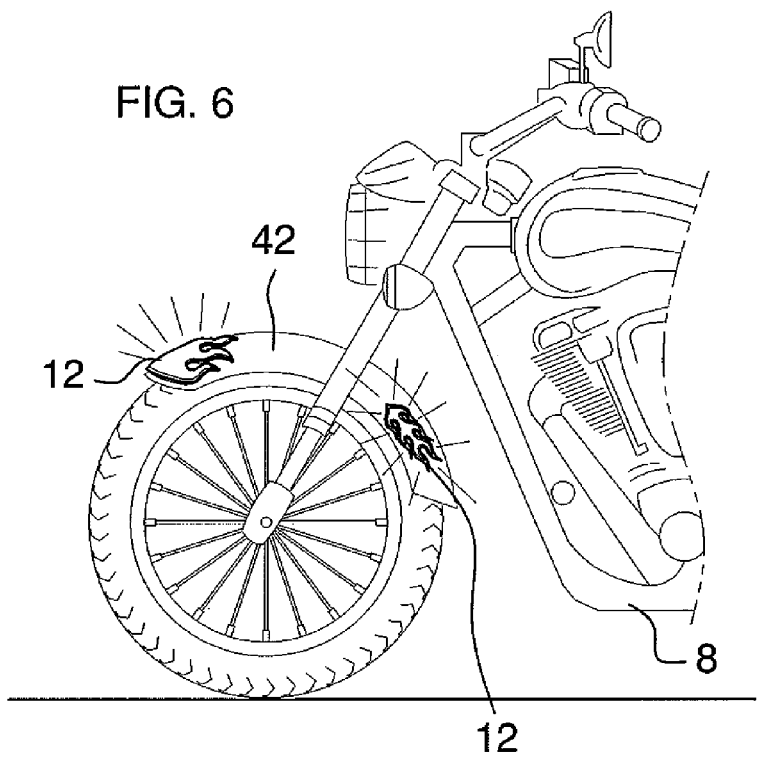
FIG. 6 is a side in-use view of the present invention.

In another embodiment, shown in FIG. 5, a threaded male coupler 50 may be attached to the base 12 to allow the base to be threadably coupled to a female coupler, not shown, on a vehicle 8.

Figure 10:
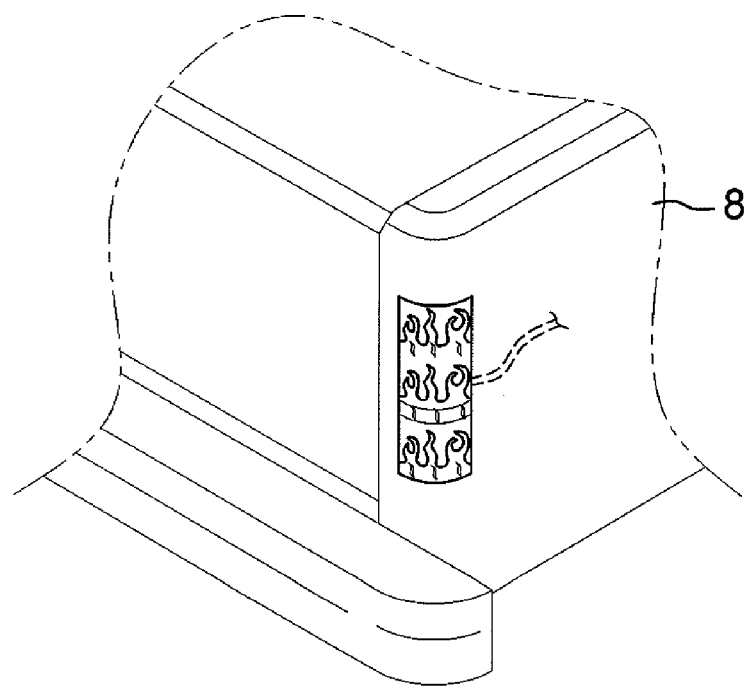
FIG. 10 is a perspective in-use view of a fifth embodiment of the present invention.

In yet another embodiment, shown in FIG. 10, the base 14 may be contoured to extend around a corner. Further, the base 14 may be attached to the vehicle 8 with an adhesive if it is positioned where fasteners 38 may not be easily used.

In use, the base 14 is attached to the vehicle 8 and electrically coupled to the power source 36 of the vehicle 8 and in particular to the light controls of the vehicle 8 so that the light emitters 32 are turned on when the lights of the vehicle 8 are turned on.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A light system for positioning on a vehicle, said light system comprising:
    a light assembly including;
        a base having a top side, a bottom side, a first lateral edge, a second lateral edge, a front edge and a rear edge, said base having a centrally positioned raised area along a line from said front edge to said rear edge, each of said top and bottom sides being angled upwardly from said first and second lateral edges toward said line, said base being flame-shaped and each of said first and second lateral sides including a plurality of appendages;
        a plurality of light emitters being mounted on said top side of said base, said light emitters being positioned along said line and along each of said appendages;
    a power source being electrically coupled to said light emitters, said power source being a power source of the vehicle; and
    a plurality of fasteners being extended into said base to secure said base to the vehicle.

2. The system according to claim 1, wherein each of said light emitters comprises a light emitting diode.

3. The system according to claim 1, wherein each of said light emitters is S-shaped.

4. The system according to claim 1, further including a covering being attached to said base and covering said plurality of light emitters, said covering comprising a translucent material.

5. The system according to claim 1, further including:
    said light assembly defining a first light assembly;
    a second light assembly having a same structure as said first light assembly;
    said fasteners extending through and securing together said first and second light assemblies, said base of said first light assembly being aligned with a base of said second light assembly and said bottom side of said first light assembly abutting a bottom side of said second light assembly.

6. The system according to claim 5, further including a post being secured between said first and second light assemblies by said fasteners, said post extending away from said first and second light assemblies.

7. A light system for positioning on a vehicle, said light system comprising:
    a light assembly including;
        a base having a top side, a bottom side, a first lateral edge, a second lateral edge, a front edge and a rear edge, said base having a centrally positioned raised area along a line from said front edge to said rear edge, each of said top and bottom sides being angled upwardly from said first and second lateral edges toward said line, said base being flame-shaped and each of said first and second lateral sides including a plurality of appendages;
        a plurality of light emitters being mounted on said top side of said base, said light emitters being positioned along said line and along each of said appendages;
    a power source being electrically coupled to said light emitters, said power source being a power source of the vehicle; and
    a threaded male coupler is attached to and extends away from said rear edge of said base, said threaded male coupler being couplable to the vehicle.

8. The system according to claim 7, wherein each of said light emitters comprises a light emitting diode.

9. The system according to claim 7, wherein each of said light emitters is S-shaped.

10. The system according to claim 7, further including a covering being attached to said base and covering said plurality of light emitters, said covering comprising a translucent material.

11. A light system for positioning on a vehicle, said light system comprising:
    a light assembly including;
        a base having a top side, a bottom side, a first lateral edge, a second lateral edge, a front edge and a rear edge, said base having a centrally positioned raised area along a line from said front edge to said rear edge, each of said top and bottom sides being angled upwardly from said first and second lateral edges toward said line, said base being flame-shaped and each of said first and second lateral sides including a plurality of appendages;
        a plurality of light emitters being mounted on said top side of said base, said light emitters being positioned along said line and along each of said appendages, each of said light emitters comprising a light emitting diode, each of said light emitters being S-shaped;
        a covering being attached to said base and covering said plurality of light emitters, said covering comprising a translucent material;
    a power source being electrically coupled to said light emitters, said power source being a power source of the vehicle; and
    a plurality of fasteners being extendable through the vehicle and into mounting wells extending into said bottom side of said base to releasably secure said base to the vehicle.

* * * * *